No. 862,228. PATENTED AUG. 6, 1907.
C. M. WRIGHT.
CHEESE CUTTER.
APPLICATION FILED NOV. 2, 1905.
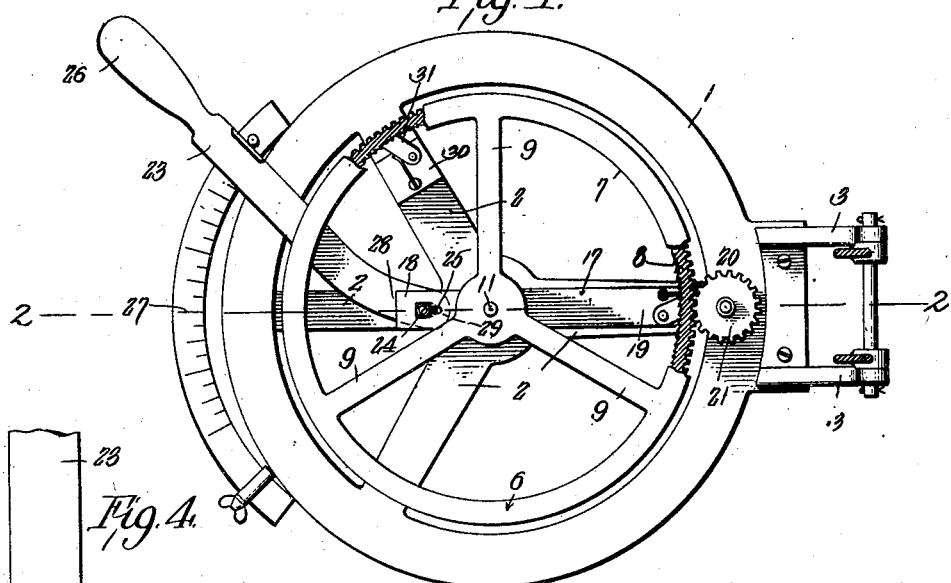
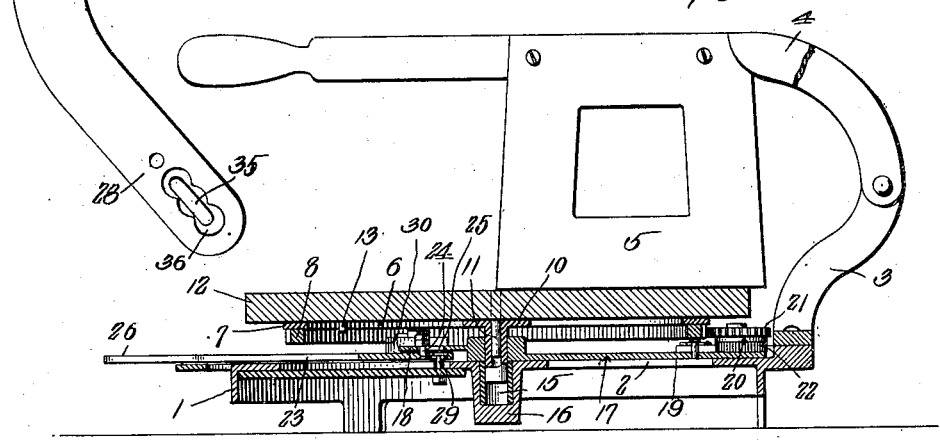
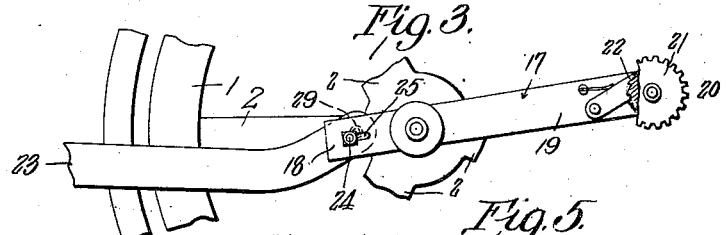
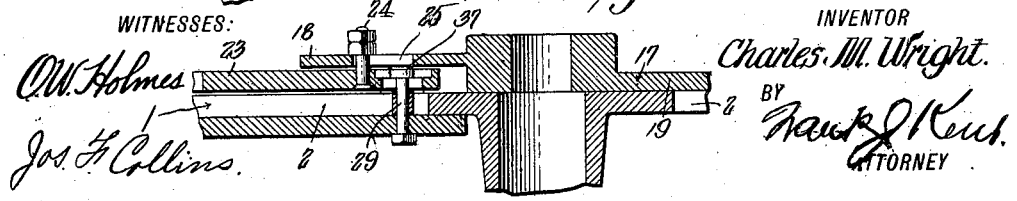
WITNESSES:
O. W. Holmes
Jos. H. Collins
INVENTOR
Charles M. Wright.
BY
Frank J. Kent
ATTORNEY

UNITED STATES PATENT OFFICE.

CHARLES M. WRIGHT, OF ANDERSON, INDIANA, ASSIGNOR, BY DIRECT AND MESNE ASSIGNMENTS, OF ONE-THIRD TO THOMAS S. GETTLE AND ONE-THIRD TO ALFRED L. REED, BOTH OF ANDERSON, INDIANA.

CHEESE-CUTTER.

No. 862,228.   Specification of Letters Patent.   Patented Aug. 6, 1907.

Application filed November 2, 1905. Serial No. 285,625.

*To all whom it may concern:*

Be it known that I, CHARLES M. WRIGHT, a citizen of the United States, residing at Anderson, in the county of Madison and State of Indiana, have invented certain new and useful Improvements in Cheese-Cutters, of which the following is a specification.

This invention relates to improvements in that class of apparatus designed for severing a cheese into segmental parts, the objects being to provide an apparatus of great simplicity wherewith a cheese of any size or weight within the capacity of the apparatus may be divided or subdivided into parts of any desired given weight or size without further attention on the part of the operator than the preliminary setting of the apparatus in accordance with the total weight or size of the cheese to be divided.

The invention consists in a measuring apparatus whereby any desired aliquot part of the cheese may be separated from the body of the cheese, regardless of the particular size or weight of the entire body, such measuring mechanism embodying a means whereby a severing knife and the cheese may be moved with relation to each other a certain predetermined angular distance by means of a controlling mechanism having a definite throw or movement.

The apparatus is provided with a rotative cheese carrier, and a mechanism for rotating said carrier embodying an operating device having a variable throw, with means for moving said device and means for adjusting the throw of said device in proportion to the total weight or to the size of the cheese to be divided.

The invention further consists in certain novel details of construction, and combination and arrangement of parts, all as will be hereinafter described, and pointed out in the appended claims.

Referring to the accompanying drawings, which are to be taken as a part of this specification: Figure 1 is a top plan view of a cheese cutter embodying my invention, with the knife removed, and parts broken away to reveal means for rotating the cheese carrier. Fig. 2 is a section on the line 2—2 of Fig. 1. Fig. 3 is a detail view illustrating the means for rotating the cheese carrier. Fig. 4 is an enlarged detail showing the actuating lever for rotating the cheese carrier, and the means for varying the throw thereof. Fig. 5 is a sectional view of a part of my apparatus, showing in enlarged detail the parts of the operating device, broken away, and the manner of their connection with the base of the cheese cutter and with each other.

Referring to the numerals on the drawings, 1 indicates the base of the apparatus, preferably a casting circular in form and of open-work construction. It consists, in the device illustrated, of a circular rim, with arms 2 extending radially from a center to said rim. Rising from the base 1 are standards 3, in the upper ends of which a knife-frame 4 is pivoted so as to swing vertically toward and from the base. A knife 5, preferably a flat blade, is mounted in the knife-frame, and a suitable handle is provided on the front of said frame, whereby the knife may be brought down to sever a cheese mounted on a carrier 6 rotative upon the base 1 below the knife. Said rotative carrier consists preferably of a casting of open-work construction—that is, it has a circular rim 7, preferably provided with an integral or rigidly attached depending annulus 8 upon which the operating lever of the apparatus is adapted to act; and arms 9 extending from said rim to a center, the central part of said casting consisting of a depending cylindrical projection 10. Into said cylindrical projection is adapted to fit a lug 11 of a cheese-support proper 12, of wood or other suitable material, and provided with a locking-lug 13 adapted to hold it in non-rotative relations with the carrier 6. Carrier 6, with the superposed cheese-support 12, is rotatably mounted upon the base 1, revolving upon the cylindrical projection 10, within a suitably depending central recess 15 of the base; a brass bearing 16 may be provided within said recess, as shown, adapted to surround the pin or projection 10.

The mechanism for continuously rotating the carrier 6 with relation to the knife in one direction only embodies a preferably two-part mechanism coöperative with said carrier. This mechanism, as shown in Figs. 1, 2, and 3, preferably comprises a bar 17, pivoted centrally of base 1 and carrier 6, as upon the central pin or projection 10 of carrier 6, and having a short arm 18, and a long arm 19 extending from the pivot out beyond the periphery of the carrier. At its outer end said long arm 19 is provided preferably with a clutch-block 20, which may comprise a cogged disk 21 rotative upon a pin at said outer end of arm 19, and adapted to engage with similar teeth upon the outer periphery of annulus 8 on carrier 6, to rotate said carrier when bar 17 is turned on its pivot 10.

For the purposes of my invention as hereinafter explained it is desirable that disk 21 be allowed to rotate in one direction. To this end the lower part of block 20 is provided with ratchet-teeth 22, engaged by a spring-pressed pawl upon the arm 19.

The arm 18 of bar 17 might be extended beyond the periphery of carrier 6 to constitute the operating handle of the bar; with such construction it is evident that the degree of movement of arm 19, and hence of carrier 6, would be equal to the degree of movement of arm 18. It is however desirable that a given movement of the operating handle should cause a relatively small movement of the carrier, because finer and more accurate adjustments of the cheese with relation to the knife are thus made possible. Therefore to the short arm 18 of bar 17 is pivotally attached a preferably bent-lever 23, as by means of a pin 24 on lever 23 engaged with and having slight play in, a longitudinal slot 25 in arm 18, and provided with an operating handle 26 extending out beyond the peripheries of base 1 and carrier 6 and movable over a scale 27 extending along the outside of base 1; constituting the other part of the preferably two-part mechanism for rotating the cheese carrier. The inner end 28 of bent-lever 23 is pivotally fulcrumed as upon one of the arms 2 of base 1, as indicated at 29, and the pivotal attachment of said arm 18 with lever 23 is upon arm 28, between fulcrum 29 thereof and handle 26, so that the pivot 24 constitutes the point of application of power of lever 23 to bar 17, said point being rotative about pivot 29.

It is evident that movement of handle 26, communicating rotative movement to pivot 24, will tend to move arm 18 and hence arm 19 of bar 17 in the same direction. As illustrated, the pawl-and-ratchet 22 is so arranged that the cogged disk 21 will be held thereby against rotation when lever 23 and bar 17 is moved to the right, so that disk 21 will act as a clutch and carry rotative carrier 6 to the right with it a distance proportionate to the movement of handle 26, and determined by the relative positions of pivots 10, 24, and 29. Upon the reverse movement of handle 26 ratchet 22 permits disk 21 to rotate, the teeth thereof passing over the teeth of annulus 8, and so communicating no movement to carrier 6. During said reverse movement of handle 26 the carrier 6 must be held against rotation, for obvious reasons. This result is accomplished by mounting, preferably upon a block 30 upon an arm 2 of base 1, a spring-pressed pawl 31 adapted to engage with ratchet-teeth upon the inner periphery of annulus 8. The pawl and ratchets are so relatively arranged that movement of the carrier 6 is permitted while, and in the direction that, disk 22 acts as a clutch, and tends to rotate the carrier, and movement thereof is prevented in the contrary direction.

It is plain that the degree of movement caused in bar 17 by a given movement of lever 23 may be varied by increasing or decreasing the distance between fulcrum 29 of lever 23 and the power-pivot 24, proportionate movement being greater as these are closer together, and vice versa. I take advantage of this fact to make my apparatus capable of use with cheeses of different sizes, by making the fulcrum 29 adjustable with respect to power-pivot 24, and so bringing these into predetermined relations appropriate to the measurement and severing of cheeses of different weights. Where the cheese is large the arc of a sector of given weight will be smaller than where the cheese is small, and vice versa, and the degree of movement of carrier 6 is regulated accordingly.

To the end above indicated, the lever 23 is made adjustable upon its fulcrum 29, preferably as follows. Said lever is provided with an elongated slot 35 at its inner end, at different points in which slot the pivot-pin or fulcrum 29 may be secured, as by providing in the surface of the lever surrounding the slot depressions 36 at the desired intervals wherein a suitable head 37 on said pivot may be engaged, retention of the head in said depressions being accomplished by means of a nut on the other end of the pin, under arm 2 to which the pin is attached.

In operation, the lever 23 being adjusted upon its fulcrum 29 in accordance with the weight of the cheese to be severed, as aforesaid, movement of lever 23 will rotate the cheese upon carrier 6 through an arc proportionate to the distance said lever is moved over the scale 27. If said scale be provided with gradations indicating pounds, etc., a sector of desired weight may thus be accurately measured off, and then severed by the knife 5.

What I claim is:—

1. In a cheese-cutter, the combination of a rotative cheese-carrier, a knife movable towards and from the carrier, and mechanism for rotating the carrier comprising a rotative operating-bar mounted on a fixed pivot, a lever for actuating said operating-bar, adjustable on its fulcrum, a connecting pivot between said actuating lever and operating-bar, the pivot of the operating-bar and the connecting pivot being adapted to be adjusted with reference to each other by the adjustment of the actuating lever on its fulcrum.

2. In a cheese-cutter, the combination of a rotative cheese-carrier, a base upon which said carrier is mounted, a knife movable to and from the carrier, and mechanism for rotating the carrier comprising a rotative operating-bar mounted on a fixed pivot, a lever controlling said operating-bar, a pivot for said lever having a head, mounted on the base, a slot in said lever for adjustably receiving said pivot, depressions in the surface of the lever surrounding said slot at determinate intervals, shaped to receive the head of the pivot.

In testimony whereof I affix my signature in presence of two witnesses.

CHARLES M. WRIGHT.

Witnesses:
THOMAS S. GETTLE,
WILLIAM D. SHUMAN.